United States Patent
Peng et al.

(10) Patent No.: US 10,148,183 B1
(45) Date of Patent: Dec. 4, 2018

(54) LOAD DETECTION CIRCUIT AND DUAL-OUTPUT POWER SUPPLY HAVING THE SAME

(71) Applicant: Chicony Power Technology Co., Ltd., New Taipei (TW)

(72) Inventors: Tso-Jen Peng, New Taipei (TW); Ssu-Hao Wang, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/962,322

(22) Filed: Apr. 25, 2018

(30) Foreign Application Priority Data

Feb. 23, 2018 (TW) .............................. 107106263 A

(51) Int. Cl.
H02M 3/158 (2006.01)
H02M 3/335 (2006.01)

(52) U.S. Cl.
CPC ..... H02M 3/1582 (2013.01); H02M 3/33507 (2013.01)

(58) Field of Classification Search
CPC .......................... H02M 3/1582; H02M 3/33507
See application file for complete search history.

(56) References Cited

U.S. PATENT DOCUMENTS

| | | | | |
|---|---|---|---|---|
| 2006/0113980 A1* | 6/2006 | Yoshida | ............. | H02M 3/1588 323/282 |
| 2007/0257647 A1* | 11/2007 | Chen | .................... | H02M 3/157 323/282 |
| 2015/0012151 A1* | 1/2015 | Park | ...................... | G05B 15/02 700/298 |
| 2015/0134980 A1* | 5/2015 | Chen | .................... | G06F 1/3206 713/300 |
| 2018/0145518 A1* | 5/2018 | Onizuka | .............. | H02J 7/0013 |

* cited by examiner

*Primary Examiner* — Jue Zhang
(74) *Attorney, Agent, or Firm* — Muncy, Geissler, Olds & Lowe, PC

(57) ABSTRACT

A load detection circuit is applied to a power converter, and the power converter provides a switch switching frequency to control a switch output voltage. The load detection circuit includes a voltage adjustment unit, an integration unit, and a power switch. The voltage adjustment unit receives the switch output voltage provided from the power converter and adjusts the switch output voltage into an adjustment voltage. The integration unit is coupled to the voltage adjustment unit to receive the adjustment voltage and integrate the adjustment voltage to provide a control voltage. The power switch is coupled to the integration unit to receive the control voltage. When the switch switching frequency is increased to make the control voltage large enough to turn on the power switch, the load detection circuit detects that the power converter is changed from a no-loading condition to a loading condition.

17 Claims, 4 Drawing Sheets

LOAD DETECTION CIRCUIT AND DUAL-OUTPUT POWER SUPPLY HAVING THE SAME

BACKGROUND OF THE INVENTION

Technical Field

The present disclosure relates to a detection circuit and a power supply having the same, and more particularly to a load detection circuit and a dual-output power supply having the same.

Description of Related Art

The statements in this section merely provide background information related to the present disclosure and do not necessarily constitute prior art.

With the increasing popularity of portable mobile devices, there are more and more opportunities for users to take mobile phones, tablet computers, laptop computers, or so on with themselves at the same time. For a charger of the portable mobile device, it would be a handy option if the same adapter is integrated for charting multiple portable mobile devices. Therefore, an adapter product with multiple output functions is introduced on the market to meet the demand to be able to simultaneously charge different portable mobile devices. For example, the adapter product provides a main output for charging the notebook computer and also provides an auxiliary output (or called a sub-output) for charging the mobile phone.

Take an adapter with two outputs (or called a dual-output adapter) for example, the sum of output power of the main output and that of the auxiliary output must be equal to the total output power of the adapter. In general, the using of power provided from auxiliary output would directly influence the power distribution of the main output of the adapter. Therefore, whether the auxiliary output provides power for a load will affect the power distribution cooperation between the main output and the auxiliary output as well as the distribution of the total output power of the adapter.

For the existing load detection, a sense resistor installed on the load side is used to detect whether a current flows through it or not to determine a no-loading operation or a loading operation. For the current sense by the sense resistor, however, the current (i.e., the load current) flowing through the sense resistor usually needs to reach a certain value, such as 100 mA to effectively detect whether the adapter is in the no-loading operation or the loading operation, or from the no-loading operation to the loading operation. In other words, once the current sensed by the sense resistor is less than the certain value (100 mA), it is difficult to accurately detect the load condition of the adapter. Therefore, the power distribution cooperation between the main output and the auxiliary output of the adapter would be conflicted or failed once the load condition has changed but not been detected since the too-small load current (for example, less than 100 mA) fails to be sensed by the sense resistor.

SUMMARY OF THE INVENTION

An objective of the present disclosure is to provide a load detection circuit to solve the problem of the conflicted or failed power distribution cooperation between the main output and the auxiliary output of the adapter since the too-small load current fails to be sensed by the sense resistor.

In order to achieve the above-mentioned objective, the load detection circuit is applied to a power converter, and the power converter provides a switch switching frequency to control a switch output voltage. The load detection circuit includes a voltage adjustment unit, an integration unit, and a power switch. The voltage adjustment unit receives the switch output voltage provided from the power converter, and adjusts the switch output voltage into an adjustment voltage. The integration unit is coupled to the voltage adjustment unit, and receives the adjustment voltage and integrates the adjustment voltage to provide a control voltage. The power switch is coupled to the integration unit, and receives the control voltage. When the switch switching frequency is increased to make the control voltage large enough to turn on the power switch, the load detection circuit detects that the power converter is changed from a no-loading condition to a loading condition.

In one or more than one embodiment, the voltage adjustment unit is a Zener diode, and the integration unit is a resistor-capacitor integration circuit.

In one or more than one embodiment, the voltage adjustment unit adjusts the switch output voltage into the adjustment voltage according to a breakdown voltage of the Zener diode.

In one or more than one embodiment, the integration unit includes a first resistor, a second resistor, and a first capacitor. The first resistor is coupled to the voltage adjustment unit to receive the adjustment voltage. The second resistor is coupled to the first resistor. The first capacitor is coupled in parallel to the second resistor to provide the control voltage.

In one or more than one embodiment, when the Zener diode with a greater breakdown voltage is provided, the first resistor with a less resistance value is correspondingly provided or the second resistor with a greater resistance value is correspondingly provided.

In one or more than one embodiment, the second resistor, the first capacitor, and the power switch are commonly connected to a ground.

In one or more than one embodiment, the adjustment voltage is a unipolar-pulse square-wave voltage.

In one or more than one embodiment, the power converter is a synchronous buck converter.

Accordingly, the load detection circuit is provided to accurately and quickly determine whether the auxiliary power converter is changed from the no-loading condition to the loading condition.

Another objective of the present disclosure is to provide a dual-output power supply to solve the problem of the conflicted or failed power distribution cooperation between the main output and the auxiliary output of the adapter since the too-small load current fails to be sensed by the sense resistor.

In order to achieve the above-mentioned objective, the dual-output power supply includes a main power converter, an auxiliary power converter, and a load detection circuit. The auxiliary power converter is coupled to the main power converter, and provides a switch output end. The load detection circuit is coupled to the switch output end. When the auxiliary power converter is changed from a no-loading condition to a loading condition, the load detection circuit outputs a system notification signal to make the auxiliary power converter provide a predetermined auxiliary output power.

In one or more than one embodiment, the load detection circuit further includes a control unit. The control unit is coupled to the power switch. When the control voltage is increased enough to a turn-on voltage to turn on the power switch, the power switch provides an output level voltage to activate the control unit to output the system notification signal.

Accordingly, the dual-output power supply is provided to accurately and quickly determine whether the auxiliary power converter is changed from the no-loading condition to the loading condition.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
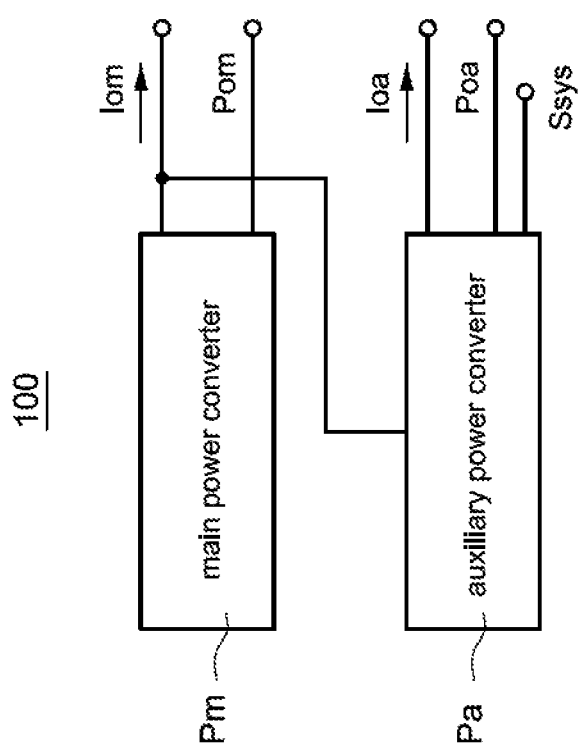
FIG. 1 is a block diagram of a dual-output power supply according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block diagram of a dual-output power supply according to the present disclosure. The dual-output power supply 100 (hereinafter referred to as "power supply 100") includes a main power converter Pm and an auxiliary power converter Pa which is coupled to the main power converter Pm. Both the output of the main power converter Pm and the output of the auxiliary power converter Pa form the dual-output topology of the power supply 100.

The main power converter Pm produces a main output current Iom and provides a main output power Pom, and the auxiliary power converter Pa produces an auxiliary output current Ioa and provides an auxiliary output power Poa. For example, a total output power of the power supply 100, such as a dual-output power adapter may be 45 Watts, namely the sum of the main output power Pom and the auxiliary output power Poa is 45 Watts. In general, the maximum output of the auxiliary output power Poa may be limited to, such as 10 Watts. In other words, the maximum output of the main power converter Pm may be 35 Watts when a load (for example an electronic device, such as a mobile phone, tablet computer, laptop computer, or so on) is connected to the auxiliary power converter Pa.

As shown in FIG. 1, the auxiliary power converter Pa generates a system notification signal Ssys to inform an external control system when the load is connected to the auxiliary power converter Pa, that is, the auxiliary power converter Pa is changed from the no-loading condition to the loading condition, and therefore the external control system further controls that the main power converter Pm can output 35 Watts (i.e., the maximum output of the main power converter Pm) and the remaining 10 Watts are reserved for the auxiliary power converter Pa.

Figure 2:
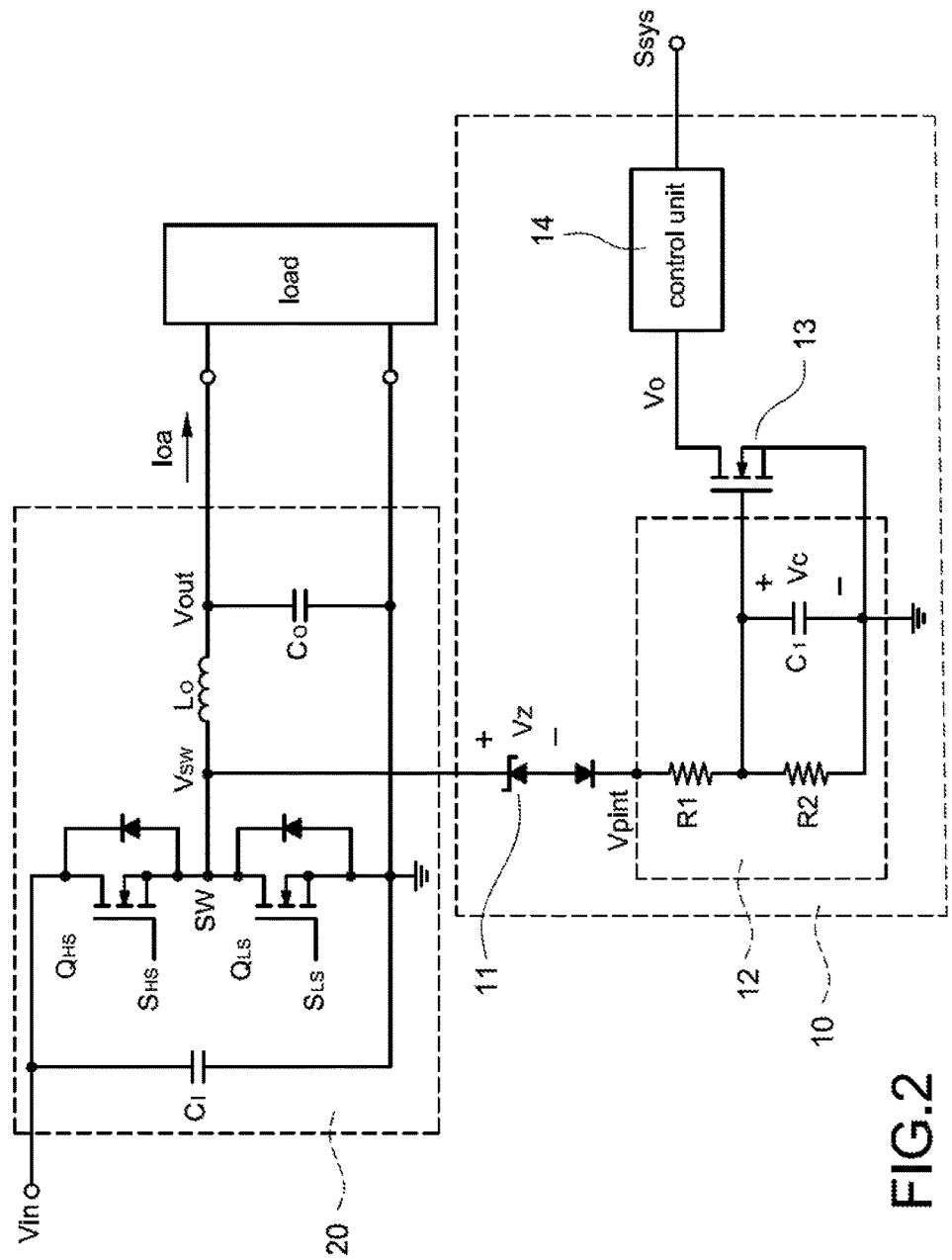
FIG. 2 is a block circuit diagram of a load detection circuit of an auxiliary power converter according to the present disclosure.

Please refer to FIG. 2, which shows a block circuit diagram of a load detection circuit of an auxiliary power converter according to the present disclosure. The load detection circuit 10 is applied to a power converter 20. For convenience, take the above-mentioned auxiliary power converter Pa as the power converter 20 for example. In one embodiment, the power converter 20 may be, for example but not limited to, a buck converter, a boost converter, a buck-boost converter, or a synchronous buck converter. In order to simplify the circuit for the convenience of explanation, the input voltage Vin, which is acquired by an AC-to-DC conversion, provides the required input power for the power converter 20.

The power converter 20 includes a high-side switch $Q_{HS}$ and a low-side switch $Q_{LS}$ coupled in series to the high-side switch $Q_{HS}$. The high-side switch $Q_{HS}$ and the low-side switch $Q_{LS}$ are switched at a switch switching frequency by a high-side control signal $S_{HS}$ and a low-side control signal $S_{LS}$, respectively. Accordingly, a switch output voltage Vsw is produced at a switch output terminal SW to which the high-side switch $Q_{HS}$ and the low-side switch $Q_{LS}$ are commonly connected. Moreover, the maximum value of the switch output voltage Vsw is determined by the input voltage Vin, the minimum value of the switch output voltage Vsw is determined by a ground to which the power converter 20 is connected, and a steady-state value of the switch output voltage Vsw is determined by an output voltage Vout of the power converter 20.

The power converter 20 further includes an output filter which is composed of an output inductor Lo and an output capacitor Co. The output filter is used to filter high-frequency harmonic components of the switch output voltage Vsw so that the auxiliary output power Poa, which is related to the smoothing output voltage Vout and the smoothing output current, i.e., the auxiliary output current Ioa, is outputted from the power converter 20 to supply power to the load.

As shown in FIG. 2, the load detection circuit 10 includes a voltage adjustment unit 11, an integration unit 12, and a power switch 13. The voltage adjustment unit 11 receives the switch output voltage Vsw of the power converter 20 and adjusts the switch output voltage Vsw into an adjustment voltage Vpint. In this embodiment, the voltage adjustment unit 11 is, for example but not limited to, a Zener diode.

The integration unit 12 is coupled to the voltage adjustment unit 11 to receive the adjustment voltage Vpint and integrate the adjustment voltage Vpint to provide a control voltage Vc, that is, the adjustment voltage Vpint is integrated by the integration unit 12 to produce the control voltage Vc. In this embodiment, the integration unit 12 is, for example but not limited to a resistor-capacitor integration circuit. Take the resistor-capacitor integration circuit as the integration unit 12 for example, the integration unit 12 includes a first resistor R1, a second resistor R2, and a first capacitor C1. The first resistor R1 is coupled to the voltage adjustment unit 11 to receive the adjustment voltage Vpint. The second resistor R2 is coupled to the first resistor R1. The first capacitor C1 is coupled in parallel to the second resistor R2 to provide the control voltage Vc.

The power switch 13 is coupled to the integration unit 12 to receive the control voltage Vc. Take a metal-oxide-semiconductor field-effect transistor (MOSFET) as the power switch 13 for example, the power switch 13 has a gate, a source, and a drain. The power switch 13 is coupled in parallel to the second resistor R2 and the first capacitor C1 between the gate and the source thereof. The second resistor R2, the first capacitor C1, and the power switch 13 are commonly connected to a ground so that the control voltage Vc is a drive voltage for driving the power switch 13. The operation of driving the power switch 13 by the control voltage Vc will be described in detail later.

Figure 3:
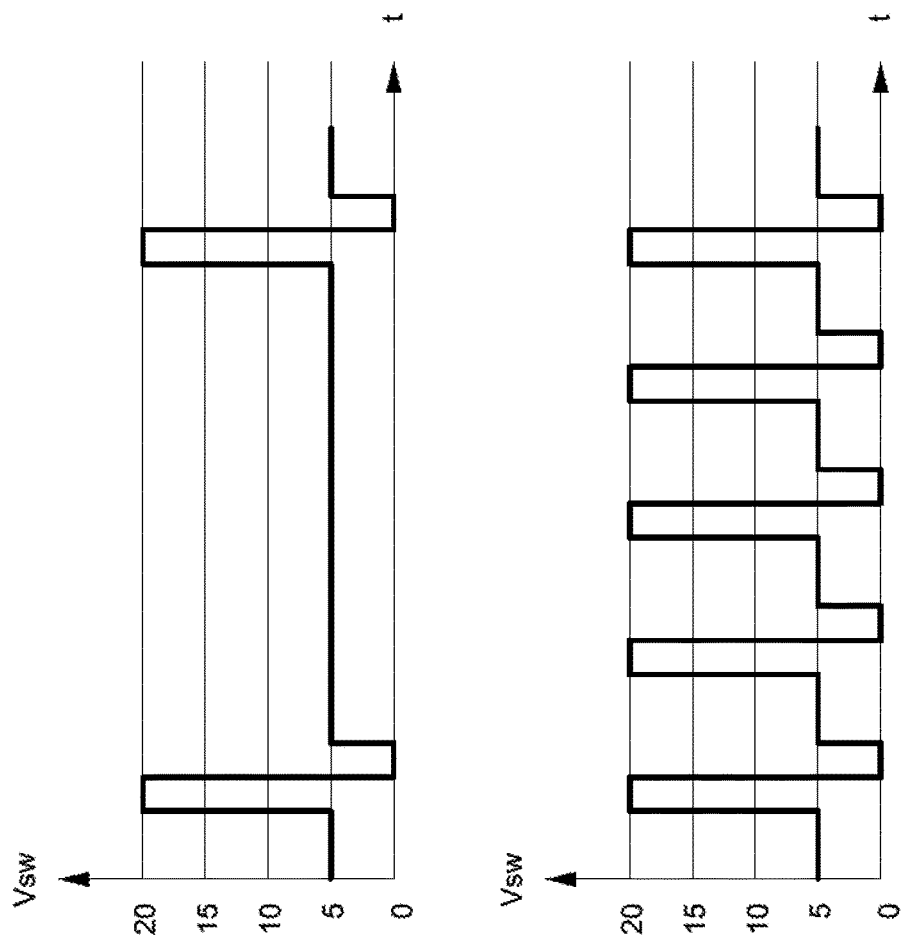
FIG. 3 are schematic waveforms of a switch output voltage of the load detection circuit according to the present disclosure.

Please refer to FIG. 3, which shows schematic waveforms of a switch output voltage of the load detection circuit according to the present disclosure. The upper part of FIG. 3 shows a schematic waveform of the switch output voltage Vsw with a low switching frequency, such as, but not limited to 100 Hz. Compared to the upper part of FIG. 3, the lower part of FIG. 3 shows a schematic waveform of the switch output voltage Vsw with a high switching frequency, such as, but not limited to 400 Hz. The "high" switching frequency is relatively (for example four times or more than four times) higher than the "low" switching frequency. As shown in the upper part and the lower part of FIG. 3, the maximum value of the switch output voltage Vsw is determined by the input voltage Vin of the power converter 20, such as 20 volts, the minimum value of the switch output voltage Vsw is determined by the ground to which the power converter 20 is connected, such as 0 volt, and the steady-state value of the switch output voltage Vsw is determined by the output voltage Vout of the power converter 20, such as 5 volts. The only difference between the upper part and the lower part of FIG. 3 is that the switching frequency is different, that is, the switching frequency of the latter is four times higher than that of the former.

More specifically, the upper part of FIG. 3 shows the schematic waveform of the switch output voltage Vsw when the power converter 20 is operated in the no-loading condition, namely no load (for example an electronic device, such as a mobile phone, tablet computer, laptop computer, or so on) is connected to the power converter 20. At this condition, the frequency of the switch output voltage Vsw is decreased for the frequency reduction operation, and even for the standby mode operation or ECO mode operation, thereby reducing switching losses. Therefore, a time interval between two adjacent turned-on periods in the upper part of FIG. 3 is longer than that in the lower part of FIG. 3.

The lower part of FIG. 3 shows the schematic waveform of the switch output voltage Vsw when the power converter 20 is operated in the loading condition, namely the load (for example an electronic device, such as a mobile phone, tablet computer, laptop computer, or so on) is connected to the power converter 20. It is assumed that a charging current (also referred to as loading current), namely the auxiliary output current Ioa is 10 mA. At this condition, the frequency of the switch output voltage Vsw is dramatically increased, for example from 100 Hz to 400 Hz or more than 400 Hz due to the inherent characteristics of the circuit components. Therefore, a time interval between two adjacent turned-on periods in the lower part of FIG. 3 is shorter than that in the upper part of FIG. 3.

In summary, the frequency of the switch output voltage Vsw is dramatically increased approximately four times although the load current slightly changes from zero to 10 mA when the auxiliary power converter Pa is initially changed from the no-loading condition to the loading condition. Accordingly, the inherent characteristic of dramatic frequency increase can be applied to accurately determine whether the auxiliary power converter Pa is changed from the no-loading condition to the loading condition.

Figure 4:
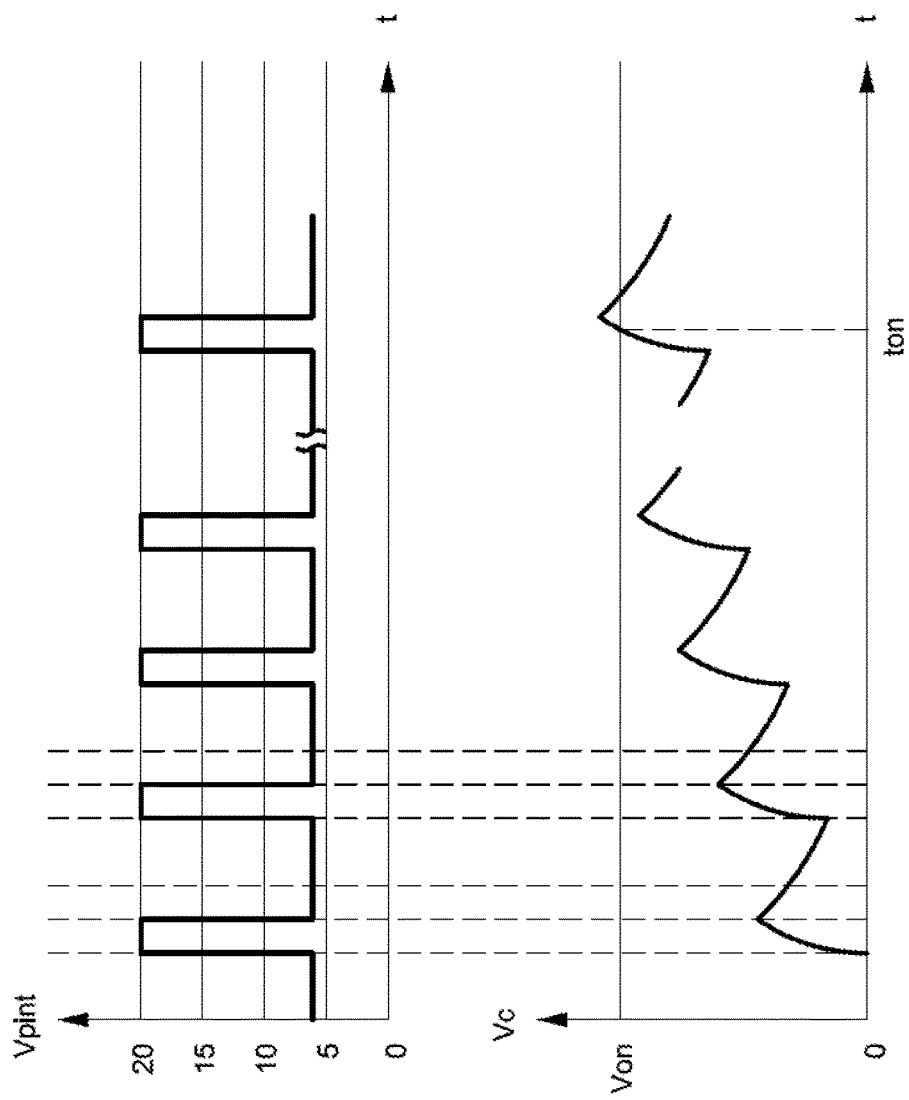
FIG. 4 are schematic waveforms of an adjustment voltage and a control voltage of the load detection circuit according to the present disclosure.

Please refer to FIG. 4, which shows schematic waveforms of an adjustment voltage and a control voltage of the load detection circuit according to the present disclosure. The adjustment voltage Vpint shown in the upper part of FIG. 4 is provided by adjusting the switch output voltage Vsw by the voltage adjustment unit 11, namely the Zener diode. In one embodiment, it is assumed that a breakdown voltage Vz of the Zener diode is 6 volts. When the switch output voltage Vsw is greater than a reverse-bias voltage of the Zener diode, the Zener diode is in a reverse breakdown operation. At this condition, the adjustment voltage Vpint shown in the upper part of FIG. 4 is provided by adjusting the switch output voltage Vsw by the voltage adjustment unit 11. In particular, the adjustment voltage Vpint is a unipolar-pulse square-wave voltage. As shown in the upper part of FIG. 4, the maximum value of the adjustment voltage Vpint is 20 volts, the minimum value of the adjustment voltage Vpint is 6 volts, and the steady-state value of the adjustment voltage Vpint is 6 volts, which is the same as the minimum value of the adjustment voltage Vpint. In other words, the adjustment voltage Vpint is a unipolar-pulse square-wave voltage having a 6-volt reference voltage.

Moreover, the resistance value of the first resistor R1 and the resistance value of the second resistor R2 may be adaptively adjusted according to the difference of the breakdown voltage Vz of the Zener diode so that the switch output voltage Vsw can be adjusted to maintain the required adjustment voltage Vpint. For example, when the Zener diode with a greater breakdown voltage Vz is provided, the first resistor R1 with a less resistance value is correspondingly provided or the second resistor R2 with a greater resistance value is correspondingly provided so as to maintain the required adjustment voltage Vpint adjusted from the switch output voltage Vsw due to the voltage-division ratio determined by the first resistor R1 and the second resistor R2.

Moreover, the adjustment voltage Vpint, which is adjusted from the switch output voltage Vsw by the voltage adjustment unit 11, is integrated by the integration unit 12 to produce the control voltage Vc. More specifically, the integration unit 12 composed of the first resistor R1, the second resistor R2, and the first capacitor C1 is used to integrate the received adjustment voltage Vpint to provide the control voltage Vc shown in the lower part of FIG. 4. In particular, since the time interval between two adjacent turned-on periods of the unipolar-pulse square-wave adjustment voltage Vpint shown in the upper part of FIG. 4 is shorter, the control voltage Vc can be accumulated and increased by integrating the adjustment voltage Vpint. In other words, a time constant ($\tau=RC$) is designed by the first resistor R1, the second resistor R2, and the first capacitor C1. In particular, the resistance value (R) of the time constant is determined by the first resistor R1 and the second resistor R2, and the capacitance value (C) of the time constant is determined by the first capacitor C1. When the control voltage Vc enters the next charging operation and the voltage value of the control voltage Vc is not less than an initial charging voltage thereof in the previous charging operation so that the control voltage Vc can be accumulated and increased by integrating the adjustment voltage Vpint. After several charging-discharging cycles to reach at a turn-on time point ton, the control voltage Vc is increased to reach a turn-on voltage Von. At this condition, the control voltage Vc is large enough to turn on the power switch 13, and therefore the power switch 13 provides an output level voltage Vo to activate a control unit 14 which is, for example but not limited to, a microcontroller (μC) or a microprocessor (μP). Accordingly, the control unit 14 outputs the system notification signal Ssys (shown in FIG. 2) to inform the external control system, and therefore the external control system further controls that the main power converter Pm can output the main output power Pom with 35 Watts (i.e., the maximum output of the main power converter Pm) and the remaining 10 Watts are reserved for the auxiliary output power Poa of the auxiliary power converter Pa.

In summary, when the auxiliary power converter Pa is changed from the no-loading condition to the loading condition since the load is connected to the auxiliary power converter Pa, the frequency of the switch output voltage Vsw is dramatically increased, and correspondingly the frequency of the adjustment voltage Vpint is dramatically increased. At this condition, the control voltage Vc is increased enough to turn on the power switch 13 so that control unit 14 is enabled to output the system notification signal Ssys to inform the external control system. Therefore, the external control system controls that the auxiliary power converter Pa may output the auxiliary output power Poa with 10 Watts reserved for the auxiliary power converter Pa, and the main power converter Pm can only output the main output power Pom with the remaining 35 Watts, which is the power difference after subtracting the reserved auxiliary output power Poa from the total output power of the power supply 100. Accordingly, the main output power Pom and the auxiliary output power Poa can be effectively and coordinately distributed.

On the contrary, when no load is connected to the auxiliary power converter Pa, the frequency of the switch output voltage Vsw is low or decreased for the frequency reduction operation, namely no dramatic frequency increase occurs. Since the time interval between two adjacent turned-on periods is longer under the low frequency of the switch output voltage Vsw, the control voltage Vc cannot be accumulated and increased by integrating the adjustment voltage Vpint by the integration unit 12. At this condition, the control voltage Vc is not large enough to turn on the power switch 13, and therefore the power switch 13 fails to provide the output level voltage Vo to activate the control unit 14. Accordingly, the control unit 14 fails to output the system notification signal Ssys (shown in FIG. 2) to inform the external control system, and therefore the external control system further controls that the total output power of the power supply 100 such as 45 Watts (shown in FIG. 1) is provided for the main power converter Pm and no reserved power for the auxiliary power converter Pa.

In conclusion, the present disclosure has following features and advantages:

1. When the load (for example an electronic device, such as a mobile phone, tablet computer, laptop computer, or so on) is connected to the auxiliary power converter Pa, the load detection circuit 10 is activated to output the system notification signal Ssys to inform the external control system and the external control system controls that the predetermined auxiliary output power Poa is reserved for the auxiliary power converter Pa.

2. When no load is connected to the auxiliary power converter Pa, the control voltage Vc is not large enough to turn on the power switch 13, and therefore the power switch 13 fails to provide the output level voltage Vo to activate the control unit 14. Therefore, the control unit 14 fails to output the system notification signal Ssys to inform the external control system so that the external control system further controls that the total output power of the power supply 100 is provided for the main power converter Pm and no reserved power for the auxiliary power converter Pa.

3. Since the auxiliary power converter Pa is changed from the no-loading condition to the loading condition, the inherent characteristic of dramatic frequency increase can be applied to accurately and quickly (within a few cycles) determine whether the auxiliary power converter Pa is changed from the no-loading condition to the loading condition so that the external control system controls that the predetermined auxiliary output power Poa is reserved for the auxiliary power converter Pa.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A load detection circuit applied to a power converter, the power converter configured to provide a switch switching frequency to control a switch output voltage, the load detection circuit comprising:
   a voltage adjustment unit configured to receive the switch output voltage provided from the power converter, and adjust the switch output voltage into an adjustment voltage;
   an integration unit coupled to the voltage adjustment unit, and configured to receive the adjustment voltage and integrate the adjustment voltage to provide a control voltage; and
   a power switch coupled to the integration unit, and configured to receive the control voltage;
   wherein when the switch switching frequency is increased to make the control voltage large enough to turn on the power switch, the load detection circuit is configured to detect that the power converter is changed from a no-loading condition to a loading condition.

2. The load detection circuit in claim 1, wherein the voltage adjustment unit is a Zener diode, and the integration unit is a resistor-capacitor integration circuit.

3. The load detection circuit in claim 2, wherein the voltage adjustment unit is configured to adjust the switch output voltage into the adjustment voltage according to a breakdown voltage of the Zener diode.

4. The load detection circuit in claim 3, wherein the integration unit comprises:
   a first resistor coupled to the voltage adjustment unit to receive the adjustment voltage;
   a second resistor coupled to the first resistor; and
   a first capacitor coupled in parallel to the second resistor to provide the control voltage.

5. The load detection circuit in claim 4, wherein when the Zener diode with a greater breakdown voltage is provided, the first resistor with a less resistance value is correspondingly provided or the second resistor with a greater resistance value is correspondingly provided.

6. The load detection circuit in claim 4, wherein the second resistor, the first capacitor, and the power switch are commonly connected to a ground.

7. The load detection circuit in claim 1, wherein the adjustment voltage is a unipolar-pulse square-wave voltage.

8. The load detection circuit in claim 1, wherein the power converter is a synchronous buck converter.

9. A dual-output power supply comprising:
   a main power converter;

an auxiliary power converter coupled to the main power converter, and configured to provide a switch output end; and a load detection circuit applied to a power converter, and the load detection circuit coupled to the switch output end, and the load detection circuit comprising:
- a voltage adjustment unit configured to receive a switch output voltage provided from the power converter, and adjust the switch output voltage into an adjustment voltage;
- an integration unit coupled to the voltage adjustment unit, and configured to receive the adjustment voltage and integrate the adjustment voltage to provide a control voltage; and
- a power switch coupled to the integration unit, and configured to receive the control voltage;

wherein when the auxiliary power converter is changed from a no-loading condition to a loading condition, the load detection circuit is configured to output a system notification signal to make the auxiliary power converter provide a predetermined auxiliary output power.

10. The dual-output power supply in claim 9, wherein the load detection circuit further comprises:
a control unit coupled to the power switch;
wherein when the control voltage is increased enough to a turn-on voltage to turn on the power switch, the power switch is configured to provide an output level voltage to activate the control unit to output the system notification signal.

11. The dual-output power supply in claim 9, wherein the voltage adjustment unit is a Zener diode, and the integration unit is a resistor-capacitor integration circuit.

12. The dual-output power supply in claim 11, wherein the voltage adjustment unit is configured to adjust the switch output voltage into the adjustment voltage according to a breakdown voltage of the Zener diode.

13. The dual-output power supply in claim 12, wherein the integration unit comprises:
- a first resistor coupled to the voltage adjustment unit to receive the adjustment voltage;
- a second resistor coupled to the first resistor; and
- a first capacitor coupled in parallel to the second resistor to provide the control voltage.

14. The dual-output power supply in claim 13, wherein when the Zener diode with a greater breakdown voltage is provided, the first resistor with a less resistance value is correspondingly provided or the second resistor with a greater resistance value is correspondingly provided.

15. The dual-output power supply in claim 13, wherein the second resistor, the first capacitor, and the power switch are commonly connected to a ground.

16. The dual-output power supply in claim 9, wherein the adjustment voltage is a unipolar-pulse square-wave voltage.

17. The dual-output power supply in claim 9, wherein the power converter is a synchronous buck converter.

* * * * *